Nov. 27, 1934.  M. NYSTROM  1,982,174
PHONOGRAPH
Filed Nov. 20, 1930  13 Sheets-Sheet 1

Inventor
Martin Nystrom

Nov. 27, 1934.    M. NYSTROM    1,982,174
PHONOGRAPH
Filed Nov. 20, 1930    13 Sheets-Sheet 2
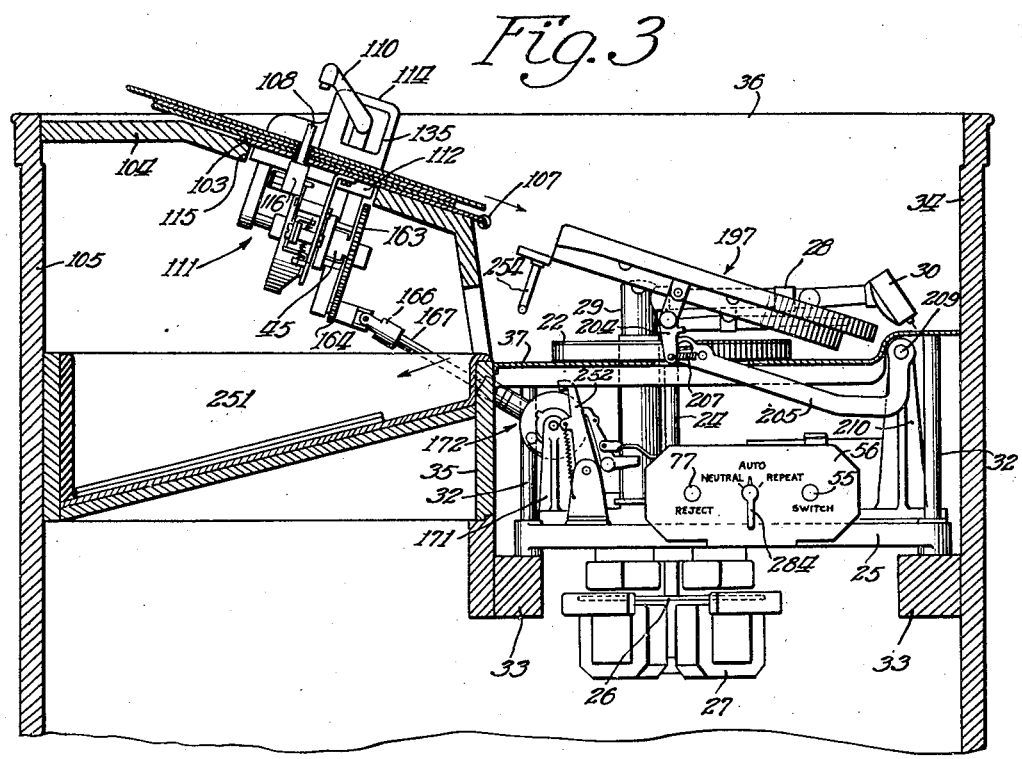
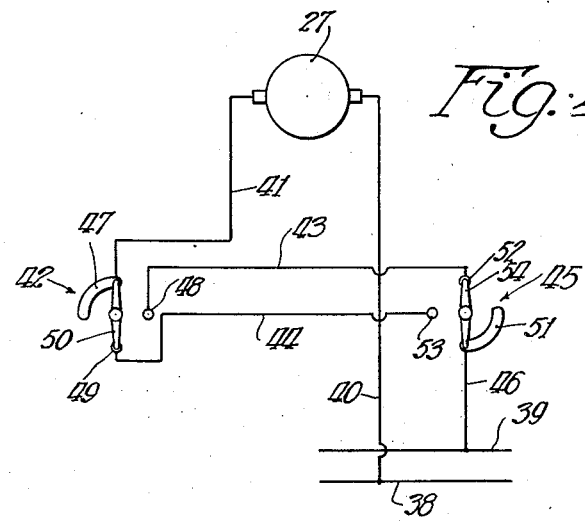
Inventor
Martin Nystrom

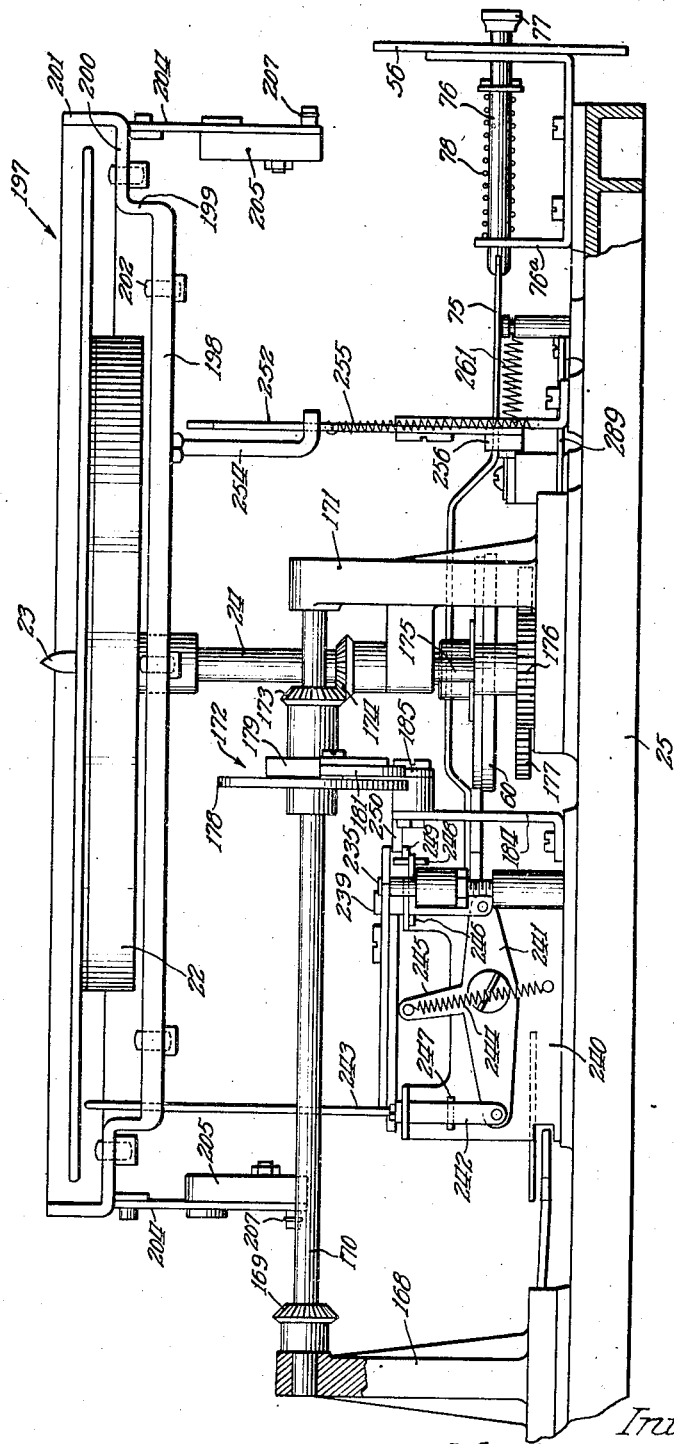

Nov. 27, 1934.  M. NYSTROM  1,982,174
PHONOGRAPH
Filed Nov. 20, 1930   13 Sheets-Sheet 5
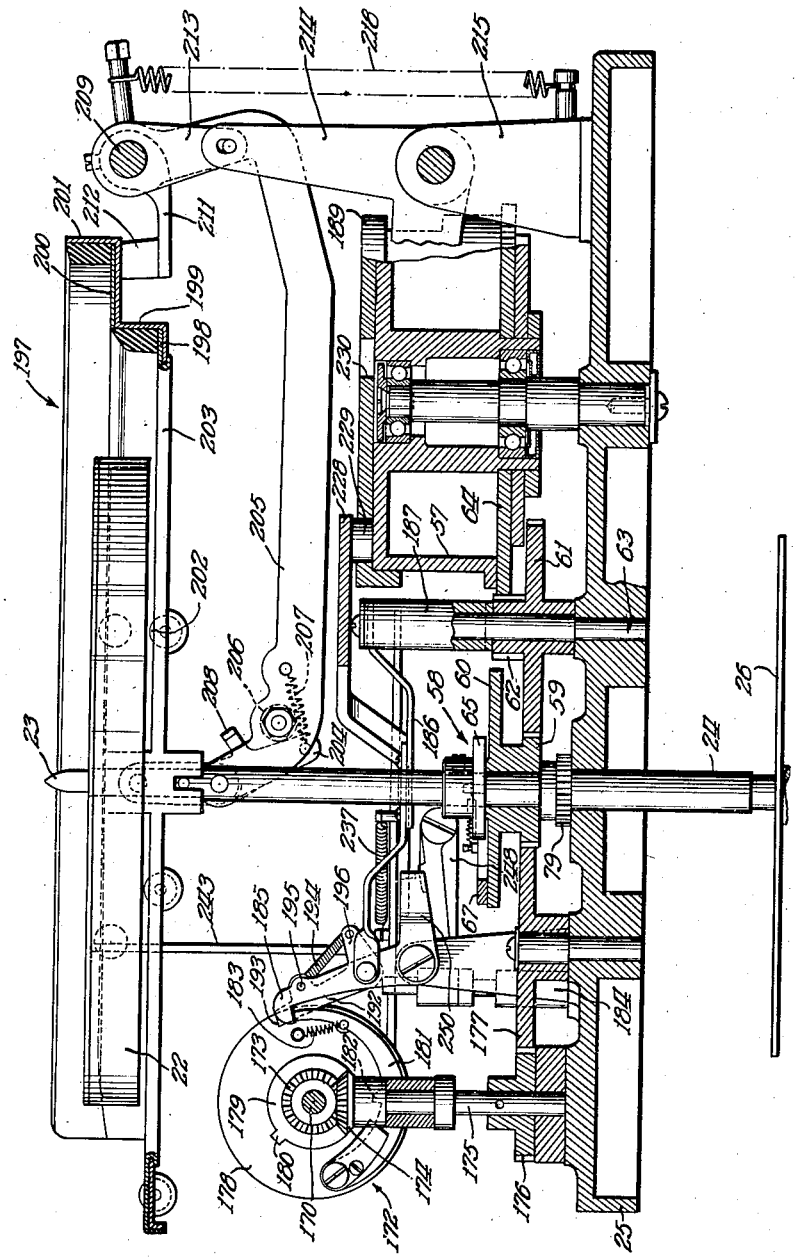
Inventor
Martin Nystrom Nov. 27, 1934.   M. NYSTROM   1,982,174
PHONOGRAPH
Filed Nov. 20, 1930   13 Sheets-Sheet 6
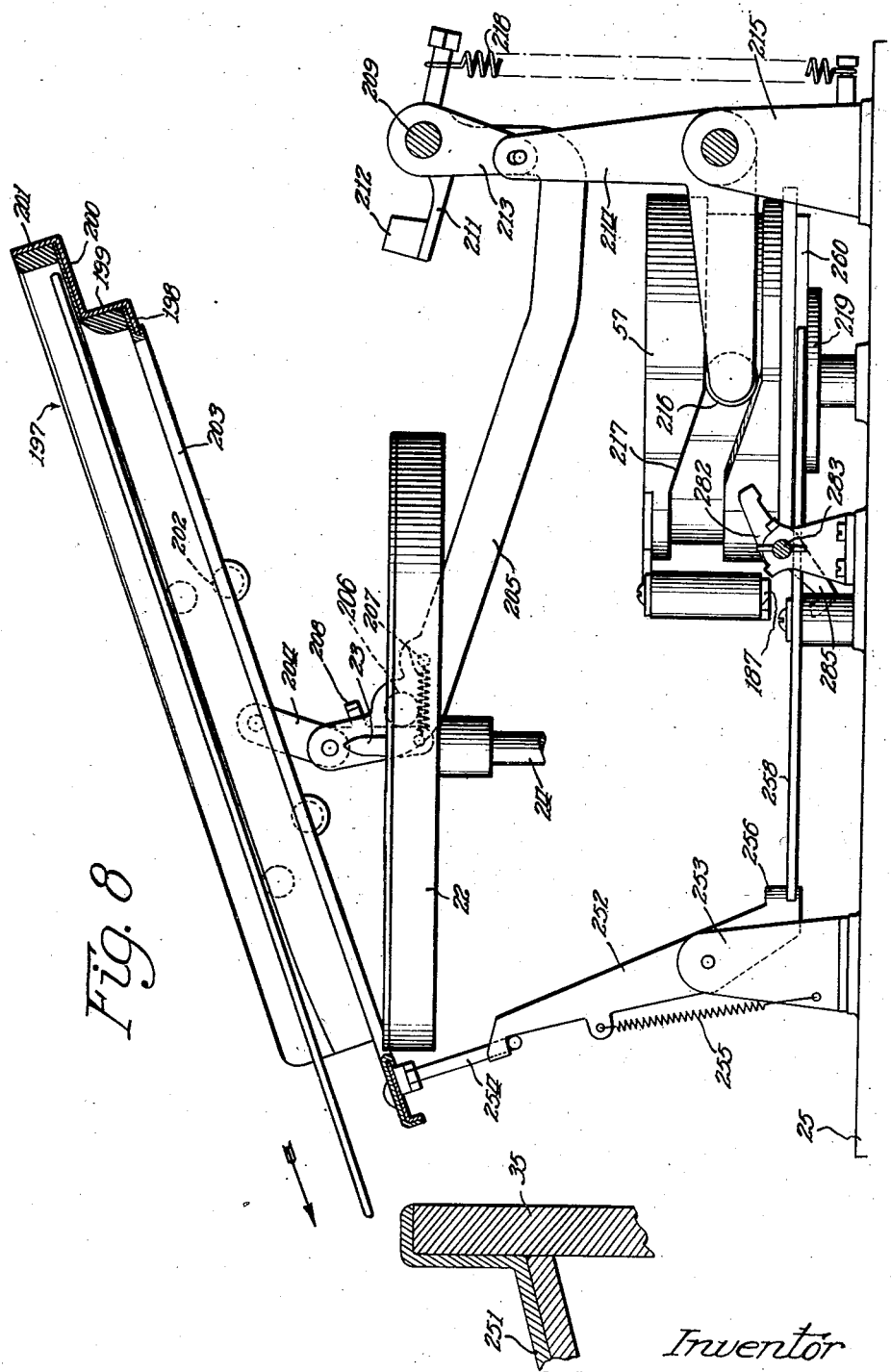
Inventor
Martin Nystrom

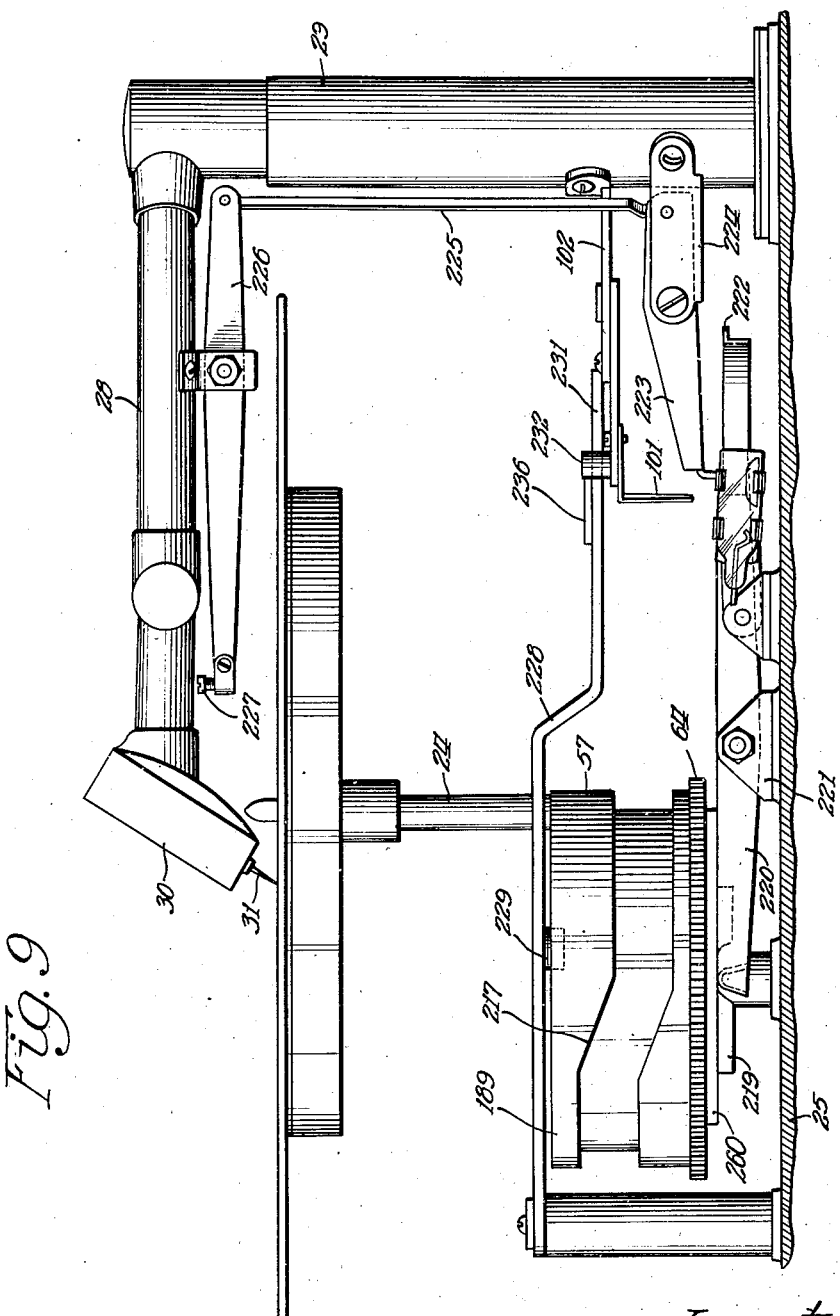

Nov. 27, 1934.  M. NYSTROM  1,982,174
PHONOGRAPH
Filed Nov. 20, 1930  13 Sheets-Sheet 8
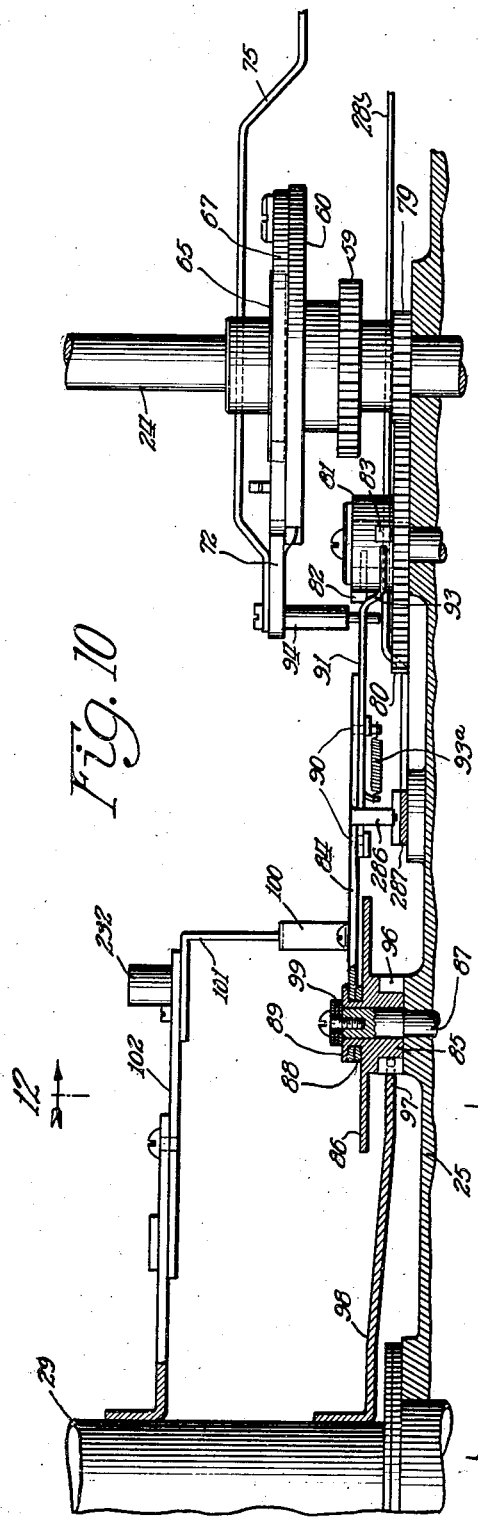
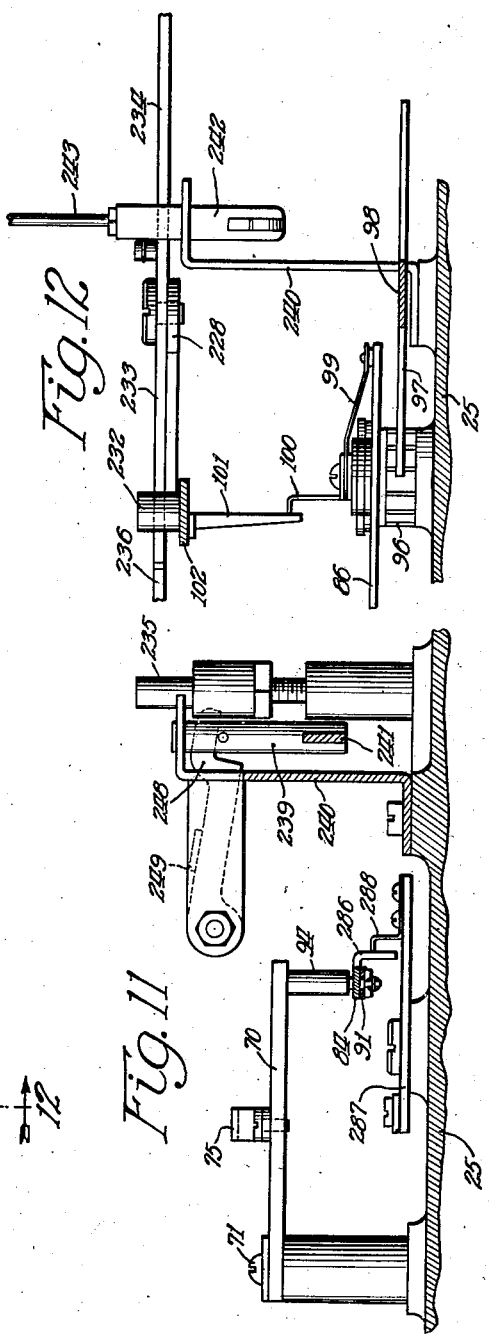
Inventor
Martin Nystrom Nov. 27, 1934.  M. NYSTROM  1,982,174
PHONOGRAPH
Filed Nov. 20, 1930  13 Sheets-Sheet 9
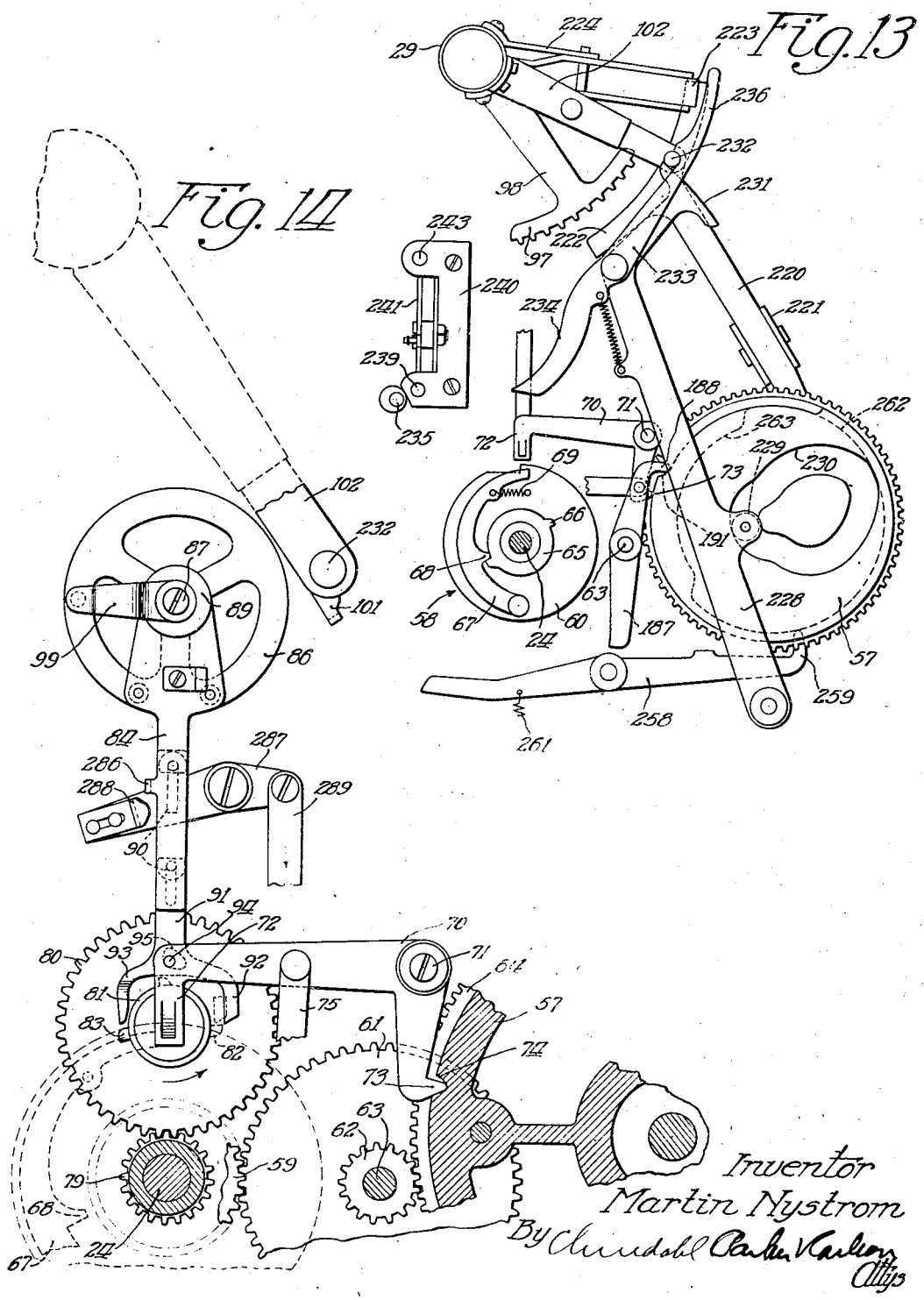

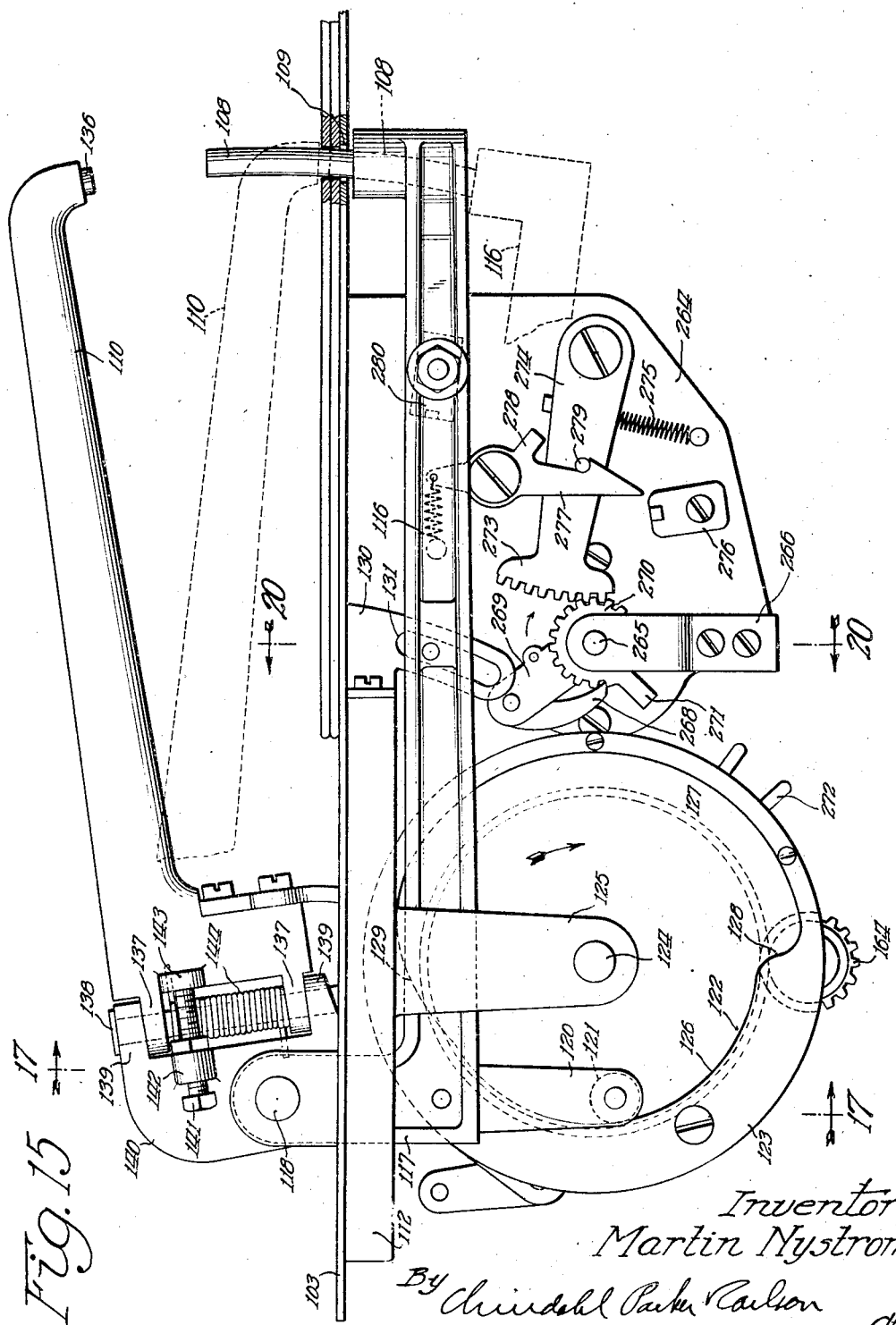

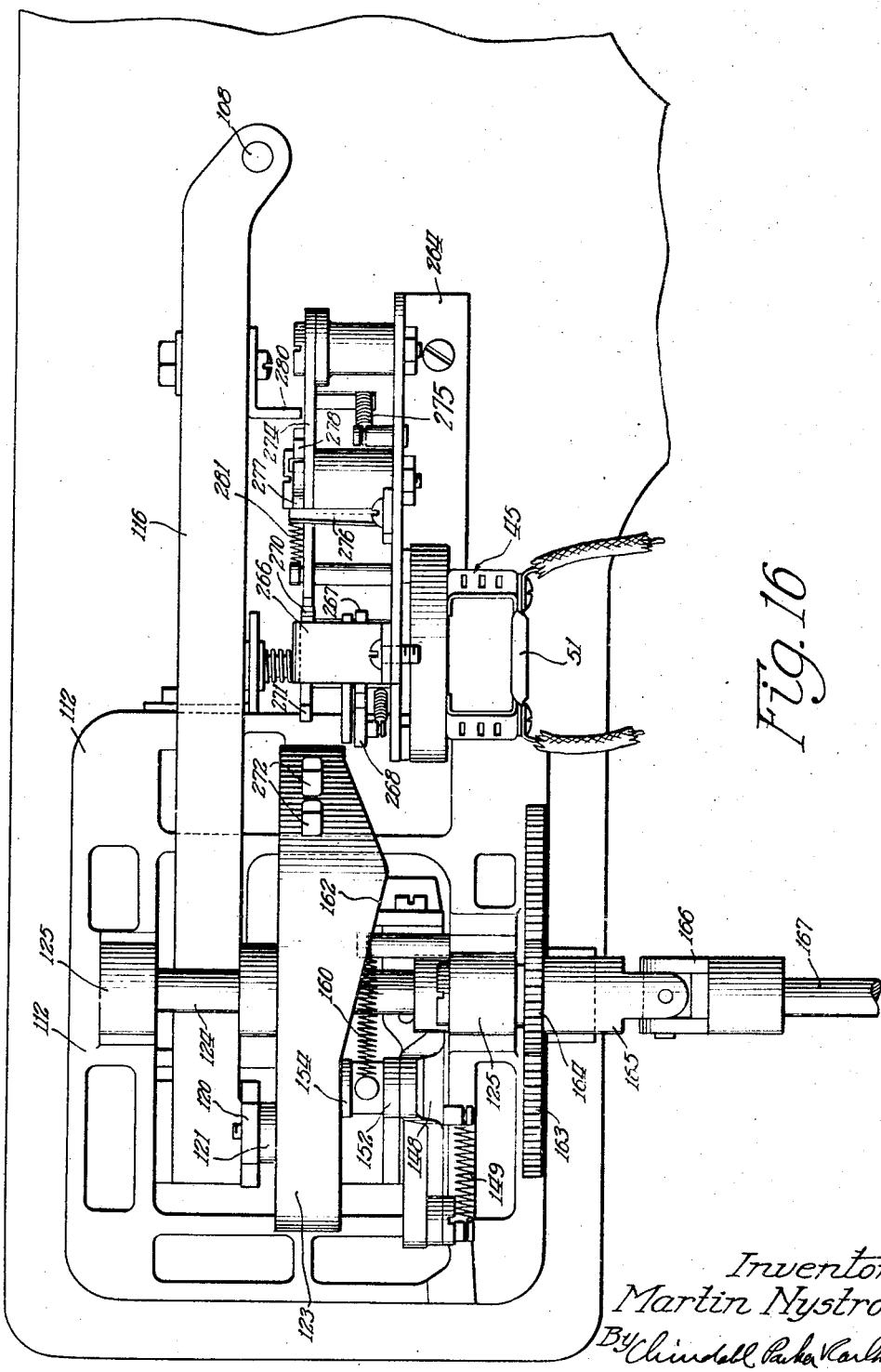

Nov. 27, 1934.　　　M. NYSTROM　　　1,982,174
PHONOGRAPH
Filed Nov. 20, 1930　　　13 Sheets-Sheet 12

Inventor
Martin Nystrom
By Chindahl Parker Karlson
Attys.

Nov. 27, 1934.                M. NYSTROM                1,982,174
                              PHONOGRAPH
                      Filed Nov. 20, 1930      13 Sheets-Sheet 13
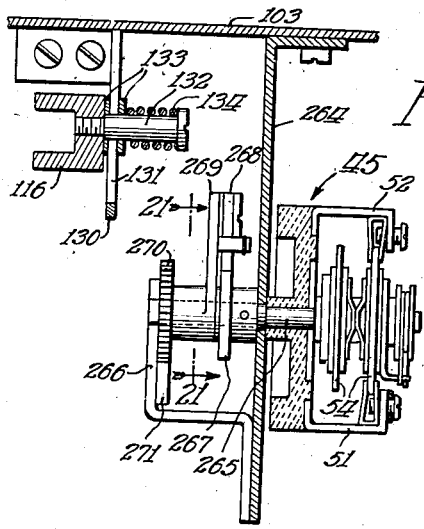
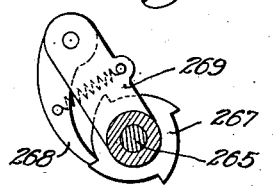
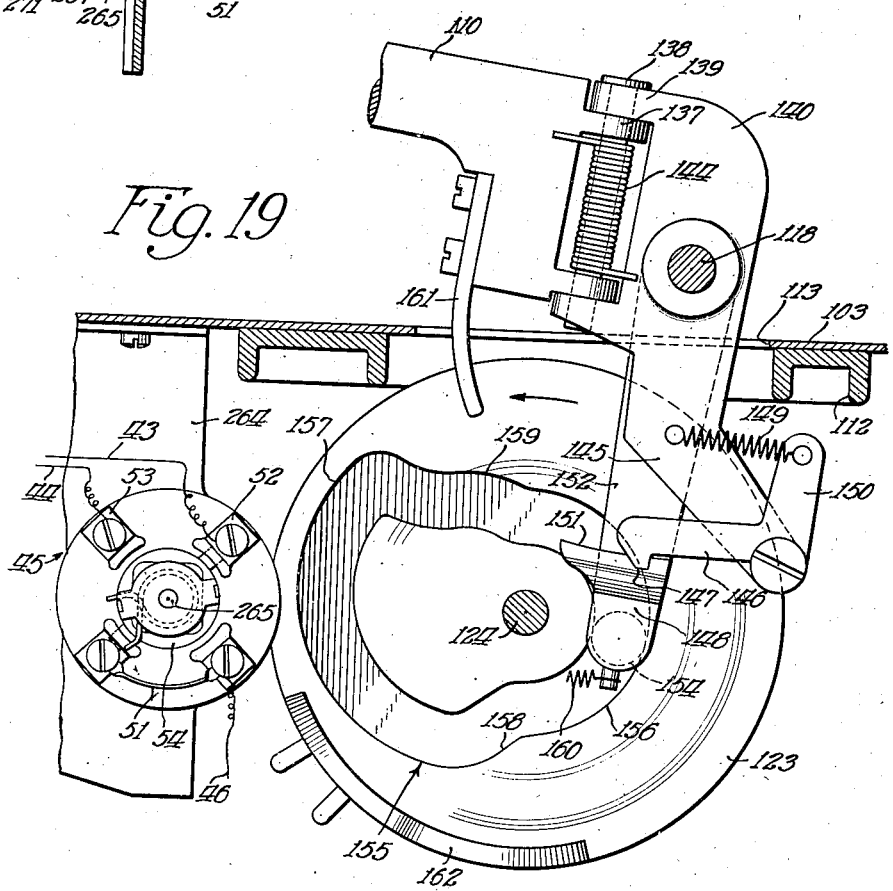
Inventor
Martin Nystrom Patented Nov. 27, 1934

1,982,174

UNITED STATES PATENT OFFICE 1,982,174

PHONOGRAPH

Martin Nystrom, Chicago, Ill., assignor to United Research Corporation, Long Island City, N. Y., a corporation of Delaware Application November 20, 1930, Serial No. 496,886

28 Claims. (Cl. 274—10)

The present invention relates to improvements in phonographs, and more particularly to phonographs capable of automatically playing a plurality of disk records in succession.

One of the primary objects of the invention resides in the provision of a novel phonograph for automaticaly playing records of different sizes in succession without intervention of the operator.

Another object is to provide a new and improved record magazine adapted for records of different sizes, said magazine including means operable in timed relation to the playing mechanism for removing the records one by one for positioning on the turntable.

A further object resides in the provision of novel means for receiving each record as it is supplied from the magazine, and positioning the record centrally on the turntable, and for discharging the record from the turntable at will or automatically upon completion of the playing of the record.

Another object resides in the provision of a switch in the control circuits for the driving motor, and means for actuating the switch to stop the motor when the last record has been removed from the magazine.

Still a further object resides in the provision of novel means available at will for rendering the means for transferring records from the magazine to the turntable and the means for discharging records from the turntable ineffective so that a given record may automatically be played repeatedly.

Another object is to provide novel means for automatically adapting the movement of the tone arm for records of different sizes.

A further object resides in the provision of a new and improved non-set means for automatically instituting the cyclic operation of the record changing mechanism upon completion of the playing of a record.

Further objects and advantages will become apparent as the description proceeds.

In the accompanying drawings, Figure 1 is a plan view of a phonograph embodying the features of my invention.

Fig. 3 is a vertical sectional view through the phonograph cabinet taken along line 3—3 of Fig. 1, and showing the operating mechanism in front elevation.

Fig. 4 is a diagrammatic representation of the control circuits.

Fig. 6 is a side elevational view of the operating mechanism.

Fig. 7 is a fragmentary vertical sectional view through the operating mechanism taken substantially along line 7—7 of Fig. 5.

Fig. 8 is a fragmentary vertical sectional view taken along line 8—8 of Fig. 5 and showing the record discharge mechanism in front elevation.

Fig. 9 is a vertical sectional view taken along line 9—9 of Fig. 5 and showing the means for actuating the tone arm and the pickup in side elevation.

Fig. 10 is a fragmentary vertical sectional view taken along line 10—10 of Fig. 5.

Fig. 11 is a fragmentary vertical sectional view taken along line 11—11 of Fig. 5.

Fig. 12 is a vertical sectional view taken along line 12—12 of Fig. 10.

Fig. 13 is a fragmentary plane view of the mechanism for actuating the tone arm.

Fig. 14 is a fragmentary plan view partially in section on an enlarged scale of the main clutch actuating mechanism.

Fig. 15 is a side elevational view of the record magazine.

Fig. 16 is a bottom view of the record magazine.

Fig. 19 is a fragmentary vertical sectional view taken along line 19—19 of Fig. 17.

Fig. 20 is a fragmentary vertical sectional view taken along line 20—20 of Fig. 15.

Fig. 21 is a fragmentary detail sectional view taken along line 21—21 of Fig. 20.

Figure 1:
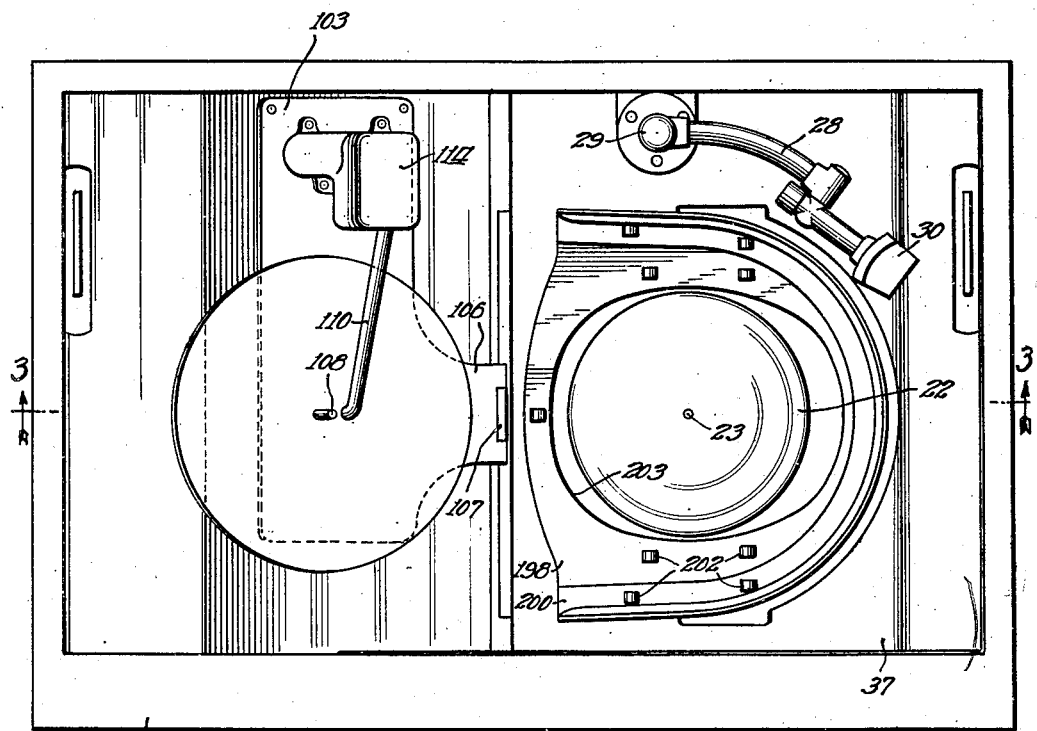
Figure 2:
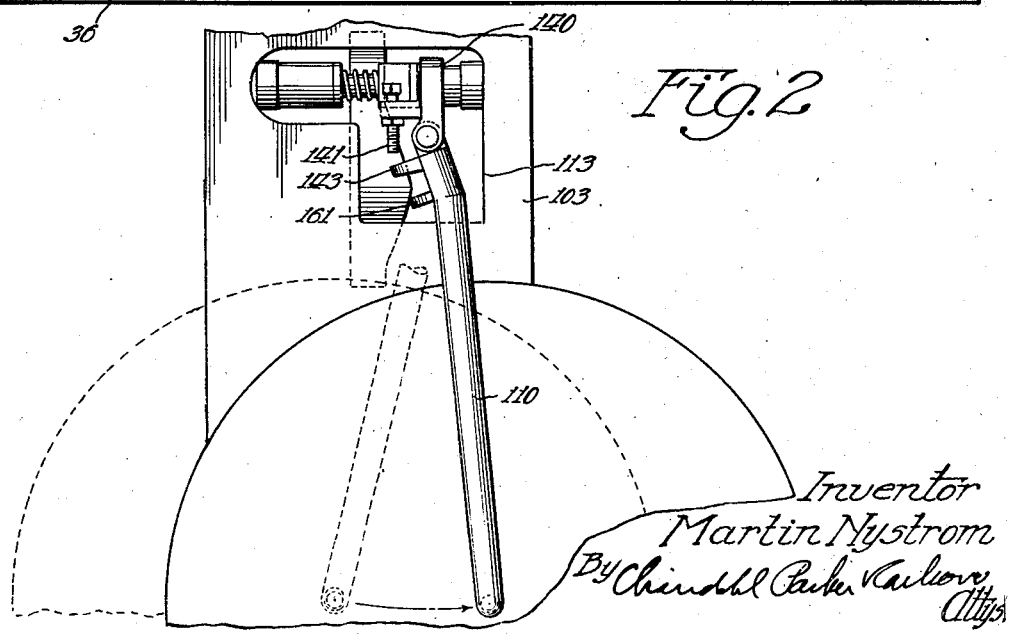
Fig. 2 is a fragmentary plan view of the record magazine.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the phonograph constituting the exemplary embodiment of the invention comprises a suitable horizontal rotatable support or turntable 22 with an upstanding axial centering pin 23. The turntable 22 is secured to the upper end of a vertical drive spindle 24 (see Figs. 6 to 9) which is suitably journaled in and extends through a fixed frame 25. The lower end of the spindle 24 is connected to a rotor 26 forming part of an electric motor 27 mounted on the underside of the frame 25.

Mounted for horizontal swinging movement over the turntable 22 is an arm 28, designated for convenience as a tone arm. The tone arm 28 comprises an upright hub portion 29 (see Fig. 9) pivotally mounted on the frame 25.

An electrical pickup 30 is pivotally mounted for vertical movement on the free end of the tone arm 28. Removably secured in the pickup 30 is a suitable stylus 31 for engaging the record groove.

The frame 25 may be supported in any suitable enclosure, and in the present instance is rigidly mounted by means of bolts 32 on spaced supports 33 secured respectively to opposed walls 34 and 35 in a cabinet 36 (see Figs. 1 and 3). A cover plate 37 is supported by the bolts 32 in parallel spaced relation to the frame 25 and just below the turntable 22 to enclose most of the parts of the operating mechanism.

Driving mechanism

The motor 27 for driving the spindle 24 may be connected to any suitable source of current, and in the present instance is adapted to be connected across two main line terminals 38 and 39, (see Fig. 4) the circuit leading from the terminal 38 through a line 40, the motor 27, a line 41, a hand switch 42, either a line 43 or a line 44, a switch 45 and a line 46 to the terminal 39.

Figure 5:
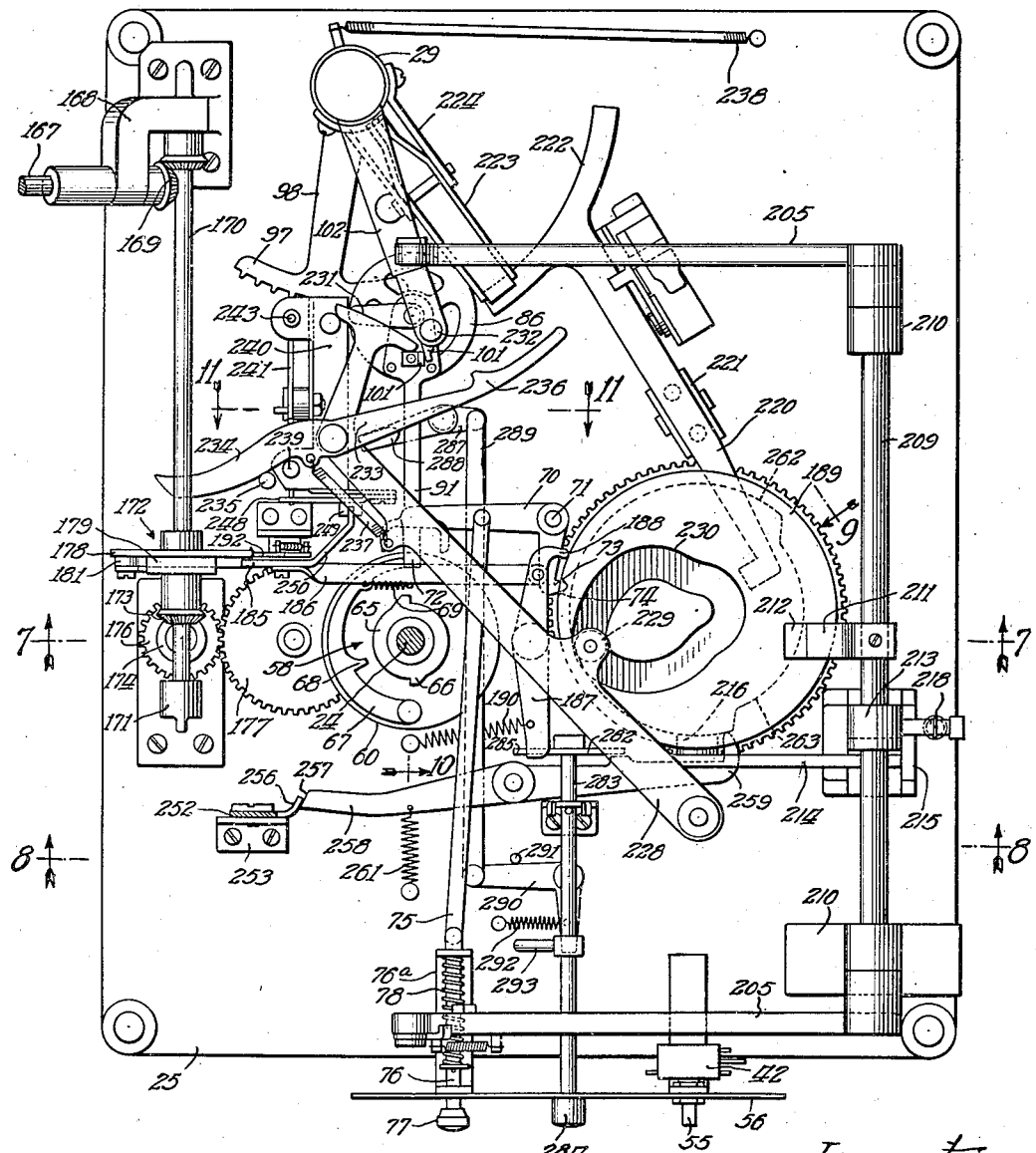
Fig. 5 is a plan view of the operating mechanism.
Figure 17:
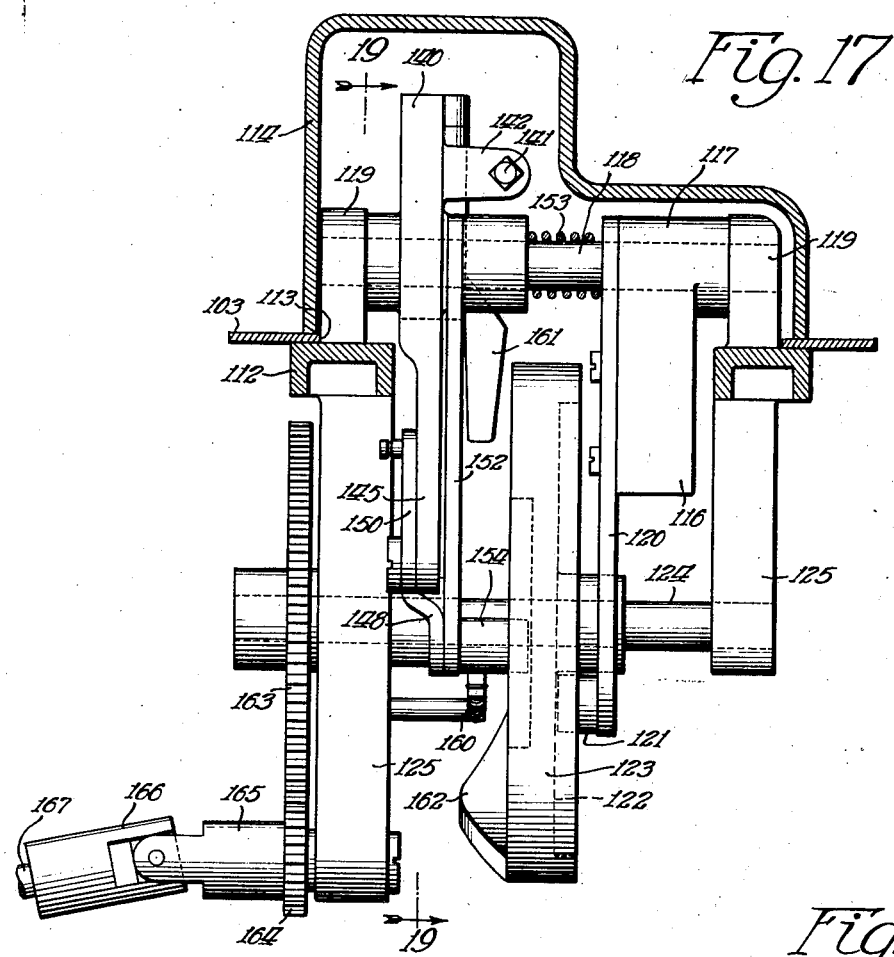
Fig. 17 is a vertical sectional view taken along line 17—17 of Fig. 15.
Figure 18:
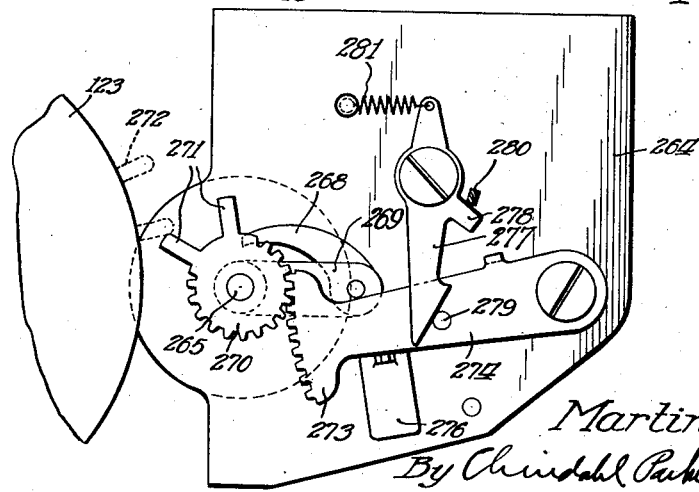
Fig. 18 is a fragmentary side elevational view of a switch actuating mechanism associated with the magazine.

Both switches 42 and 45 are of the three-way type. Thus, the switch 42 comprises an intermediate contact 47 connected to the line 41, and opposed contacts 48 and 49 adapted to be connected selectively through a switch blade 50 to the contact 47. The switch 45 comprises an intermediate contact 51 connected to the line 46, and opposed contacts 52 and 53 connected respectively through the lines 43 and 44 to the contacts 48 and 49 and adapted to be connected selectively through a switch blade 54 to the contact 51. It will be evident that the switches 42 and 45 are adapted to be connected in series, and that when so connected, movement of either switch into its other position will break the prevailing circuit through one of the lines 43 and 44 and will prepare a circuit through the other of said lines adapted to be closed upon movement of the other switch into its other position. The hand switch 42 is provided with a hand actuator 55 extending to the front of a vertical panel 56 (see Figs. 3 and 5) mounted on the front end of the frame 25. The switch 45 as hereinafter described is adapted to be actuated automatically to break the prevailing circuit when the last record is removed from the record magazine.

The various means for carrying out the record changing operation, namely for transferring records from the magazine onto the turntable, elevating and lowering the pickup 30, swinging the tone arm 28, and discharging records from the operation of a turntable, are dependent on the operation of a primary element, preferably a rotary cam member 57, adapted to be driven periodically through one complete revolution.

The cam member 57 may be connected to any suitable source of power, and preferably is adapted to be connected through a suitable clutch 58 (see Figs. 5 and 7) to the drive spindle 24 for the turntable 22. To this end, a pinion 59 rigid on its upper end with a circular clutch plate 60 is freely rotatable on the spindle 24. The pinion 59 meshes with a gear 61 rigid with a concentric pinion 62 and freely rotatable on a fixed stud 63 on the frame 25. The pinion 62 meshes with a large gear 64 rigidly secured against the underside of the cam member 57.

A clutch element 65 having a plurality of peripherally spaced ratchet teeth 66 is rigidly secured to the spindle 24 directly against the top of the clutch plate 60. Pivotally mounted at one end on the plate 60 for movement therewith is an arcuate clutch shoe 67 having a tooth 68 movable into and out of position for engagement by able into and out of position to connect the drive to the one of the teeth 66 to connect the drive to the pinion 59. A coiled tension spring 69 tends to swing the shoe 67 inwardly to establish this connection.

Suitable trip means is provided for normally holding the clutch elements 65 and 67 out of engagement, and operable manually at will or automatically under the influence of the tone arm 28 to release the clutch elements into engagement for a predetermined period, for example to drive the cam member 57 through one complete revolution. This means preferably comprises a bell-crank lever 70 pivotally mounted on a fixed post 71 on the frame 25.

One arm of the lever 70 (see Fig. 14) is formed with a lateral extension 72 to constitute a detent movable into and out of the path of the free end of the clutch shoe 67. The other arm of the lever 70 is formed with a finger 73 riding on the periphery of the cam member 57, and adapted to engage in a notch or recess 74 in said periphery when the cam member is in its idle or inoperative position. It will be evident that when the notch 74 is moved into engagement with the finger 73, the lever 70 will be movable into position to throw out the clutch, and that upon closing the clutch 58 to institute rotation of the cam member 57, the periphery of the latter will act to hold the lever 70 in inoperative position for one complete revolution.

Assuming the clutch 58 to be open, the manual means (see Figs. 5, 6 and 14) for effecting closing of the clutch comprises a link 75 pivotally connected at one end to the lever 70 and at the other end to a plunger 76 slidable in a bracket 76ª on the frame 25. The plunger 76 extends through the panel 56, and is provided with a rejector button 77. A light spring 78 on the plunger 76 tends to move the button 77 forwardly into position for manual actuation.

A non-set means which is rendered operable when the tone arm 28 ceases to swing inwardly, as for example when the stylus 31 has reached the inner end of the sound groove, is provided for automatically tripping the lever 70 to close the clutch. This means (see Figs. 10 to 12 and 14) comprises a pinion 79 on the spindle 24 and meshing with a gear 80 journaled on the frame 25. Rigid with the gear 80 is a coaxial disk 81 formed with two peripherally and axially spaced teeth 82 and 83.

A lever 84 is pivotally mounted on the hub 85 of a friction disk 86 journaled on a fixed stud 87 on the frame 25, and is frictionally confined between a washer 88 bearing against the disk and a peripheral flange 89 on the hub for movement with the disk. Slidably secured as by means of two pin and slot connections 90 to the free end of the lever 84 and in effect constituting a longitudinal extension thereof is a bar 91, the free outer end of which is bifurcated to provide a pawl 92 for engagement by the tooth 82 and a cam finger 93 for engagement by the tooth 83. A coiled tension spring 93ª tends to urge the bar 91 outwardly into its extreme extended position.

Depending from the detent 72 is a connecting pin 94 which extends loosely into an irregular opening or slot 95 formed in the free end of the bar 91. It will be evident that the reciprocatory movements of the bar 91 will be transmitted through the pin 94 to the lever 70 to move the detent 72 into and out of the path of the clutch shoe 67, and that the spring 93ª therefore tends to urge the detent 72 into position to open the clutch 58.

The friction disk 86 is operatively connected to the tone arm 28 to rotate in timed relation to the swinging movement thereof. The connection preferably comprises a pinion 96 coaxial and rigid with the disk 86, and in mesh with a gear sector 97 on the outer end of a lateral arm 98 rigidly secured to the hub portion 29 of the tone arm 28. A leaf spring 99 secured to the stud 87 extends into frictional engagement with the upper face of the disk 86.

It will be evident that upon each revolution of the disk 81, the pawl 92 will be cammed by the tooth 83 into position for engagement by the tooth 82. However, as long as the tone arm 28 continues to move inwardly during the playing of a record, the friction disk 86 will be rotated slowly, and hence will through frictional engagement with the lever 84 return the pawl 92 to inoperative position before engagement by the tooth 82. When, however, the stylus 31 has reached the final groove of the record and further rotation of the record fails to continue the inward movement of the tone arm 28, the disk 86 will remain stationary, and the pawl 92 will remain in position for engagement by the tooth 82. Upon such engagement, the bar 91 will be moved against the action of the spring 93ª, and through the pin 94 will withdraw the detent 72 from the shoe 67 to effect closing of the clutch 58.

To provide a limit stop, an upstanding leaf spring 100 is secured to the lever 84 in the path of a depending finger 101 on the free end of a lateral arm 102 secured to the hub portion 29 of the tone arm 28. Upon movement of the tone arm 28 into its extreme innermost position, it will hold the pawl 92 in the path of the tooth 82 to effect closing of the clutch 58 regardless of rotation of the disk 86.

*Record supply means*

The records are supplied to the turntable 22 one by one from a suitable magazine (see Figs. 15 to 19). In the present instance, the magazine comprises a base plate 103 which is rigidly secured on a wall 104 forming part of the cabinet 36, and on which the records are stacked in coaxial superimposed relation. The wall 104 extends upwardly from the wall 35 and then at an elevation substantially above the turntable 22 to an outer wall 105 of the cabinet. The base plate 103 and the underlying portion of the wall 104 are inclined downwardly and toward the turntable 22, and the lower edge of the former is formed with a lateral extension 106 in the free end of which a roller 107 is mounted.

A retractible upstanding centering pin 108 is adapted to extend upwardly through an aperture 109 in the base plate 103 into the central apertures of the records to hold the latter in position. The length of the pin 108 when in its uppermost position above the base plate 103 determines the number of records that may be mounted thereon at one time. A transfer member 110 is operable to selectively engage the uppermost record of the stack, and to feed this record upon retraction of the pin 108 sufficiently to release same off the stack and over the roller 107 for positioning on the turntable 22.

The pin 108 and the transfer member 110 form part of a record feeding mechanism indicated generally at 111, and preferably mounted on the base plate 103. In the present instance, the mechanism 111 comprises a frame 112 mounted on the underside of the base plate 103 across an opening 113, and a housing 114 over the opening. An opening 115 is formed in the supporting wall 104 under the base plate 103 and about the frame 112 to accommodate the operating parts of the feeding mechanism 111.

The pin 108 preferably is mounted on the free end of an elongated lever 116 extending along the underside of the base plate 103. A vertical transverse arm 117 rigid with the base end of the lever 116 is pivotally mounted on a fixed shaft 118 secured at its ends in spaced upstanding lugs 119 on the frame 112. Also rigid with the base end of the lever 116 is a depending arm 120 which carries a roller 121 adapted to ride along an internal rotary cam 122 formed in one side of a cam disk 123. This disk is secured to a shaft 124 journaled in two spaced depending brackets 125 on the frame 112.

The cam 122 is formed with two arcuate faces 126 and 127 of relatively small and large radii joined by an abrupt drop 128 and a gradual rise 129, each face extending approximately through 180°. When the roller 121 engages the face 126, the pin 108 is locked in its uppermost position, and when the roller moves off of this face over the face 127, the pin 108 is free to move downwardly to release the uppermost record.

Mounted on the underside of the base plate 103 is a depending bracket 130 extending closely across one side of the lever 116 and formed with an elongated slot 131. A bolt 132 is adjustably threaded into the lever 116 and extends therefrom through the slot 131. Two washers 133 are positioned on the bolt 132 respectively to engage opposite sides of the bracket 130, and a coiled compression spring 134 disposed on the outer end of the bolt acts against the outer washer, the parts thus providing an adjustable friction clamp for the lever to resist independent movement of the latter when released by the cam 122.

The transfer member 110 preferably is in the form of an elongated arm extending out of the housing 114 through an opening 135 substantially horizontally over the records, and formed on its free end with a depending selector pin 136 in arcuate alignment with the pin 108. The arm 110 is mounted to swing downwardly to move the pin 136 into the central aperture of the uppermost record, thereby retracting the pin 108 sufficiently to release the record, and then to swing laterally to remove the record from the stack.

The base end of the arm 110 is formed with a pair of parallel spaced ears 137 pivotally mounted on a pin 138 extending through overlapping ears 139 on a supporting head 140. An adjustable stop screw 141 is threaded through a lug 142 on the head 140 for engagement by a lug 143 on the arm 110 to accurately locate the latter with the pin 136 in position for movement into the central aperture of the uppermost record. A coiled tension spring 144 on the pivot pin 138 has its free ends respectively in engagement with the arm 110 and the head 140, and tends to swing the arm laterally toward and hold it against the stop screw 141.

The supporting head 140 is pivotally mounted on the fixed shaft 118 against one of the lugs 119, and has a depending arm 145. Pivotally mounted on the free end of the arm 145 is a hook 146 adapted to engage in a notch 147 formed in the upper edge of a plate 148. A coiled tension spring 149 connected at its ends to the arm 145 and to a heel 150 on the hook 146 tends to urge the latter yieldingly against the plate 148. The outer side of the notch 147 presents a square surface adapted for positive engagement with the hook 146 to elevate the arm 110 from the records upon movement of the plate 148 inwardly. The other side of the notch 147, however, is inclined and adjacent a track 151, and is adapted for an impositive engagement with the hook 146 to lower the arm 110 into engagement with the uppermost record upon movement of the plate 148 outwardly, and upon such engagement to permit continued outward movement of the plate independently of the hook by swinging the hook against the action of the spring 149 upwardly for relative movement along the track 151.

The plate 148 is mounted on the lower end of a depending arm 152 pivotally mounted on the shaft 118 against the head 140. A coiled compression spring 153 on the shaft 118 is interposed in end abutting engagement between the arm 152 and the arm 117, and serves to hold the various parts on the shaft in position. A lateral pin 154 on the free end of the arm 152 extends into a continuous cam groove 155 formed in the adjacent side of the cam disk 123. The cam groove 155 has an arcuate portion 156 of a relatively small radius extending through approximately 180° for defining the uppermost position of the arm 110, an opposed arcuate portion 157 of a relatively large radius for defining the lowermost position of the arm 110, and connecting portions 158 and 159. A coiled tension spring 160 serves to hold the pin 154 yieldingly against the inner surface of the cam groove 155.

It will be evident that the cam groove 155 will impart to the arm 152 an oscillatory movement of a definite amplitude sufficient in extent to swing the transfer arm 110 through its maximum range of vertical movement, and that the connection between the power arm 152 and the transfer arm 110 is susceptible of disengagement when the latter is held against further movement through engagement with the uppermost record, thus automatically adapting the selecting movement of the latter to the number of records on the base plate 103.

Secured to the base end of the arm 110 is a depending finger 161 which projects into the path of a cam 162 formed on the adjacent side of the cam disk 123. The cam 162 is effective upon engaging the finger 161 to swing the arm 110 laterally toward the turntable 22 to feed a record from the stack, and upon releasing the finger 161 to permit a return movement of the arm 110 to initial position.

The idle position of the cam disk 123 is shown in Figs. 15 and 19. The cams 122, 155 and 162 are so related that upon rotation of the disk 123 through one complete revolution, the lever 116 will be released, then the arm 110 will be lowered until it engages the uppermost record with the pin 136 in the central aperture, the pin 136 serving to depress the pin 108 to release the record, then the arm 110 will be swung to feed the record from the stack for positioning on the turntable, and finally the lever 116 and the arm 110 will be returned to initial position.

The drive for the cam disk 123 comprises a gear 163 on the shaft 124 meshing with a pinion gear 164 on a stub shaft 165 journaled in one of the brackets 125. The shaft 165 is connected through a universal joint 166 to a shaft 167 journaled in a bracket 168 (see Fig. 5) on the frame 25. The shaft 167 is connected through bevel gears 169 to a horizontal shaft 170 journaled at one end in the bracket 168 and at the other end in a bracket 171 on the frame 25.

Rotatable on the shaft 170 and adapted to be connected thereto through a clutch 172 is a bevel gear 173 which meshes with a bevel gear 174 secured to a vertical shaft 175 journaled in a bracket 171. The shaft 175 is connected for a continuous drive through a gear 176, and an idler gear 177 mounted on the frame 25 to the pinion gear 59 on the main spindle 24.

The clutch 172 (see Figs. 5, 6 and 7) comprises a disk 178 rigid with the shaft 170. A second disk 179 rigid with the bevel gear 173 is rotatably disposed up against the disk 178, and is formed with a clutch tooth 180 on its periphery. Pivotally mounted at one end on the disk 178 is an arcuate shoe 181 formed intermediate its ends with a clutch tooth 182 adapted for engagement by the tooth 180 to complete the drive connection from the gear 173 to the shaft 170. A coiled tension spring 183 tends to urge the shoe 181 in a direction to move the tooth 182 into the path of the tooth 180.

Pivotally mounted on the upper end of a bracket 184 on the frame 25 is a detent 185 movable into and out of position for engagement by the free end of the shoe 181 to separate the clutch teeth 180 and 182. The detent 185 is connected through a link 186 to a lever 187 pivotally mounted intermediate its ends on the stud 63. One end of the lever 187 is formed with a finger 188 riding on the periphery of a cam plate 189 secured to the top of the driving cam 57. A coiled spring 190 anchored to the other end of the lever 187 and to the frame 25 tends to urge the finger 188 against the plate 189. The cam plate 189 normally serves to hold the detent 185 positively in the path of the shoe 181. Formed in the periphery of the plate 189 is a notch 191 which is movable into position to receive the finger 188 shortly after rotation out of idle inoperative position. The spring 190 urges the finger 188 into the notch 191 thereby retracting the detent 185 from the shoe 181 and causing the clutch 172 to close. The notch 191 quickly moves past the finger 188 thus reestablishing the detent 185 in initial position, but the latter is not effective to open the clutch 172 until the shoe 181 completes one revolution.

Pivotally mounted on the detent 185 is a pawl 192 adapted to engage in a notch 193 in the periphery of the disk 178, when the clutch 172 is open, to lock the shaft 170 against reverse movement. A coiled tension spring 194 is anchored at its ends to a pin 195 on the detent 185 and a heel 196 on the pawl 192 to press the latter against the disk 178.

Each record when removed by the base plate 103 is delivered by the arm 110 to a carrier 197 for positioning the record centrally onto the turntable 22. In the present instance, the carrier 197 (see Figs. 6, 7 and 8) comprises a tilting frame formed with a base wall 198 adapted to be raised and tilted into alignment with the base wall 103 to receive the record. The base wall 198 is formed, excepting along the record receiving edge, with an upstanding marginal flange 199 which is shaped to conform to the curvature of the record and to closely embrace same. Preferably, the carrier 197 is formed to adapt same for handling records of different sizes, for example 10 inch and 12 inch records. To this end, an elevated peripheral extension 200 of the base wall 198 is formed along the upper edge of the flange 199, and is formed with an upstanding marginal flange 201 similar to the flange 199. Thus, a 10 inch record would rest on the base wall 198 and would be located by the flange 199, and a 12 inch record would rest on the extension 200 and would be located by the flange 201. Preferably, suitable rollers 202 are mounted in the base wall 198 and the extension 200 to facilitate movement of the records against the respective flanges 199 and 201. The base wall 198 is formed with an opening 203 adapted to pass about the turntable 22 when the carrier 197 is lowered so as to permit the record to be positioned centrally on the turntable.

To operatively support the carrier 197, it is trunnioned at the front and rear respectively in two levers 204 pivotally mounted on the free ends of two parallel, spaced and normally horizontal supporting arms 205. The pivotal axis of the carrier 197 is located off center so that the carrier when raised will normally tilt through its own weight into alignment with the base plate 103 of the record feeding mechanism. Each of the levers 204 is normally held in a substantially vertical position against a stop 206 on the associated arm 205 by a coiled tension spring 207, and is formed with a lug 208 adapted for engagement with the arm to limit movement of the lever against the action of the spring 207.

The arms 205 are secured to a horizontal rock shaft 209 journaled in two upstanding brackets 210 on the frame 25. Also secured to the shaft 209 intermediate the arms 205 is an arm 211 provided on its free end with a rest 212 for supporting the carrier 197 in rest position. A depending crank arm 213 on the shaft 209 has a pin and slot connection at its free end with one arm of a bell-crank lever 214 mounted in a bracket 215 on the frame 25. The other arm of the lever 214 carries a roller 216 disposed in a peripheral cam groove 217 on the cam drum 57. The groove 217 is suitably shaped to effect oscillation of the shaft 209 at the desired time to raise and lower the carrier 197. A coiled tension spring 218 tends to oscillate the shaft 209 to raise the carrier 197.

*Means for elevating pickup*

The means for elevating and lowering the pickup 30 (see Figs. 5 and 9) comprises an arcuate cam 219 on the underside of the cam member 57. The lead end of the cam 219 is adapted immediately upon rotation to ride onto and depress one end of a lever 220 pivoted intermediate its ends in a suitable bracket 221 on the frame 25. The other end of the lever 220 is formed with an arcuate plate 222 which underlies one end of a lever 223 pivotally mounted intermediate its ends in a lateral arm 224 rigid with the hub portion 29. The other end of the lever 223 is connected through a vertical link 225 to the inner end of a lever 226 pivoted intermediate its ends on the underside of the tone arm 28.

The outer end of the lever 226 is provided with an adjustable rest 227 for elevating and supporting the pickup 30 while the cam 219 is in engagement with the lever 220. Upon movement of the cam 219 out of engagement with the lever 220 the pickup 30 is free to drop through its own weight to bring the stylus 31 into unrestrained engagement with the record groove.

*Means for swinging tone arm*

To swing the tone arm 28 into and out of playing position with the pickup 30 elevated, a lever 228 (see Figs. 5, 9 and 13) is pivotally mounted at one end on the frame 25, and is provided intermediate its ends with a roller 229 engaging in a cam groove 230 formed in the top of the cam plate 189. The free end of the lever 228 is formed with a laterally inclined extension having an arcuate end face 231 movable upon oscillation of the lever 228 through rotation of the plate 189 into engagement with an upstanding pin 232 on the free end of the arm 102 to swing the tone arm 28 and the pickup 30 outwardly beyond the record.

Pivotally mounted intermediate its ends on the lever 228 is a lever 233, one end of which constitutes a cam arm 234 adapted to ride against a fixed abutment 235 on the frame 25, and the other end of which is formed with a hook 236 for engaging the pin 232. A coiled tension spring 237 tends to hold the cam arm 234 yieldingly against the abutment 235.

The parts are so formed and related that upon movement of the tone arm 28 outwardly beyond the record, the hook 236 will be moved into position to engage the pin 232, and that upon reversal of the lever 228 through the last half of the rotation of the cam plate 189, the hook 236 through engagement with the pin 232 will swing the tone arm 28 inwardly until the pickup 30 is located over the starting point of the record groove at which point the cam arm 234 will swing the hook 236 to release the pin 232. Thereupon, the stylus 31 will be free to travel inwardly along the record groove. Preferably, a tension spring 238 is provided tending to urge the tone arm 28 inwardly over the record.

The abutment 235 is effective to release the tone arm 28 at the proper point for a record of a given size, for example ten inch. A supplemental abutment 239 is provided for use in place of the abutment 235 to release the tone arm 28 at the proper point for a record of a different size, for example twelve inch. Preferably, the abutment 239 is automatically projected into operative position when the record for which it is intended is placed on the turntable 22, and is automatically withdrawn into operative position when the record is removed. To this end, the abutment 239 (see Figs. 5 and 6) is slidably confined for vertical movement in a bracket 240 on the frame 25, and is located adjacent the abutment 235 but in position when elevated to release the tone arm 28 after a shorter inward movement than the abutment 235 would permit. A rocking lever 241 on the bracket 240 is connected at one end to the lower end of the abutment 239 and at its other end to the lower end of a plunger 242 also vertically slidable in the bracket. Secured to the plunger 242 is a vertical stem 243 adapted to extend above the turntable 22 beyond the normal periphery of a ten inch record but for depression through engagement with the underside of a twelve inch record. A snap-over spring 244, anchored to the bracket 240 and a lateral arm 245 on the lever 241, tends to swing the latter in one direction or the other upon movement across dead center. Stop pins 246 and 247 carried respectively by the abutment 239 and the plunger 242 for engagement with the bracket 240 serve to limit the movement of the lever 241 and hence to define the operative and inoperative position of the abutment 239.

Pivotally mounted on the bracket 240 is a lever 248 the free end of which extends across the pin 246 and is adapted to be raised thereby upon movement of the abutment 239 into operative position. The lever 248 is formed with a lug 249 which underlies a heel extension 250 on the detent 185, and which when elevated is adapted for engagement thereby to return the abutment 239 to inoperative position when the clutch 172 is closed to supply another record to the turntable. Thus, coincident with the transfer of each record to the turntable 22, the control mechanism for the tone arm 28 is automatically adjusted for a ten inch record, but if a twelve inch record is supplied it will through engagement into the stem 243 automatically adapt the mechanism to the difference in size.

Record discharge mechanism

The carrier 197 is utilized upon instituting the operation of the cam drum 57 to discharge the record on the turntable 22 when a change of record is desired. To this end, the carrier 197 upon being elevated is tilted into alignment with a discharge receptacle 251 built into the cabinet 26 between the walls 35 and 105 to lift the record from the turntable 22 and to cause the record to slide through its own weight over the rollers 202 into the receptacle 251. After the discharge of the record, the carrier is released for tilting movement into position to receive another record from the record feeding mechanism.

In the present instance, the means for tilting the carrier 197 to discharge the record (see Figs. 5, 6 and 8) comprises a latch 252 pivotally mounted intermediate its ends on an upstanding bracket 253 on the frame 25. The latch 252 is adapted for engagement with a hook 254 depending from the discharge end of the carrier 197 when the latter is in inoperative position, and is urged into engagement with the hook by a coiled tension spring 255. The tail end of the latch 252 is formed with a cam lug 256 in cooperative engagement with an inclined cam face 257 on one end of a lever 258 pivotally mounted intermediate its ends on the frame 25. The other end of the lever 258 is formed with a finger 259 riding against a peripheral cam 260 on the underside of the cam drum 57. A coiled tension spring 261 serves to hold the finger 259 yieldingly against the cam 260, and hence to retract the cam face 257 into position to permit movement of the latch 252 into engagement with the hook 254.

The cam comprises an outer arcuate portion 262, the back end of which is normally in engagement with the finger 259 to hold the latch 252 in inoperative position when the cam drum 57 is in its rest position, and an inner arcuate portion 263 adapted upon movement into engagement with the finger 259 to effect a release of the latch 252. The portion 263 is of such length that the finger 259 will ride onto the lead end of the portion 262 to disengage the latch 252 from the hook 254 immediately after the record has been discharged so as to permit the carrier 197 to tilt into position to receive the next record.

Automatic stop

The switch 51 is available to stop the operation of the phonograph automatically upon removal of the last record from the base plate 103. Preferably the switch 51 is actuated to break the prevailing circuit and to prepare a parallel circuit adapted to be closed upon actuating the hand switch 47, by a mechanism (see Figs. 15 to 21) rendered operable by the lever 116 upon movement of the latter to release the bottom record.

To this end, the switch 51 is mounted on a bracket 264 on the underside of the base plate 103 and comprises an operating shaft 265 journaled in the bracket and at one end in a second bracket 266 mounted on the bracket 264. A ratchet 267 is secured to the shaft 265 for rotation therewith, and is adapted to be actuated by a pawl 268 which is pivotally mounted on the free end of an arm 269 rigid with a pinion 270 freely rotatable on the shaft 265. It will be evident that upon rotation of the pinion 270 in a counterclockwise direction as viewed in Fig. 15, the shaft 265 will be operated to actuate the switch, and that upon rotation in the opposite direction, the pinion will be ineffective to operate the shaft.

To provide means for rotating the pinion 270 in an actuating stroke, it is formed with two elongated teeth 271 adapted for meshing engagement by similar teeth 272 on the periphery of the cam disk 123 shortly before the latter completes one of its periodic revolutions. The teeth 271, however, are held out of the path of the teeth 272 until the last record on the base plate 103 is released by the pin 108. To this end, the pinion 270 meshes with a gear sector 273 on an arm 274 pivoted on the bracket 264. A coiled tension spring 275 tends to swing the arm 274 downwardly against a stop 276 on the bracket 264 to rotate the pinion 270 in its free return stroke and thereby to position the teeth 271 for engagement by the teeth 272. A hook 277 having a lug 278 is pivotally suspended on the bracket 264 for engagement with a pin 279 on the arm 274 to hold the latter in its upper position and thereby maintain the switch operating mechanism inoperative.

A stop 280 is adjustably mounted on the arm 116, and is adapted to move into engagement with the lug 278 to trip the hook 277 against the action of a spring 281 when the arm is lowered sufficiently to release the last or bottom record on the base plate 103. Thereupon, the arm 274 will be swung downwardly to effect movement of the pawl 268 in its preparatory stroke. Subsequently, the cam disk 123 will again lock the arm 116 in its uppermost position, and the teeth 272 will engage the teeth 271 to actuate the switch 51. As a result, the arm 274 will be swung upwardly, and again locked in position by the hook 277.

Repeat playing

To effect the automatic playing of a given record repeatedly, the record feeding mechanism and the mechanism for tilting the carrier 197 to discharge the record are rendered inoperable at will. In this event, upon the operation of the cam drum 57, the tone arm 28 and the pickup 30 will be operated as when playing the records in series, but the carrier 197 will merely be raised and lowered to lift the record and then to replace it on the turntable 22.

The means for rendering the record feeding mechanism inoperative (see Figs. 5 and 8) preferably comprises a locking bar 282 secured transversely intermediate its ends to a shaft 283 for pivotal movement therewith. The shaft 283 is provided with an actuator 284 at the panel 56 movable selectively into "automatic" position and "repeat" position. One end of the bar 282 is formed with a hook 285 adapted to be moved into locking engagement with the lever 187 to hold the latter against movement when the notch 191 in the cam plate 189 is in registration with the finger 188, thus preventing the normal automatic closing of the clutch 172.

The other end of the bar 282 constitutes the means for locking the record discharge mechanism against operation, and to accomplish this purpose is movable simultaneously with movement of the hook 285 into engagement with the lever 187, into position to block movement of the lever 258 when the cam portion 263 is moved into registration with the finger 259, thus locking the latch 252 against movement into engagement with the hook 254.

To adjust the parts for repeat playing, the actuator 284 is adjusted into "repeat" position. Such adjustment is ineffective to render the clutch 58 inoperative so that the operation of the machine will continue to be automatic.

Non-automatic operation

For non-automatic operation, means is provided for rendering the clutch 58 inoperable. In the present instance, this means (see Figs. 5, 10, 11 and 14) comprises a depending lug 286 on the bar 91. A lever 287 on the frame 25 carries an upstanding leaf spring 288 movable into and out of the path of the lug 286. The spring 288 when in engagement with the lug 286 serves to hold the pawl 92 out of the path of the tooth 82 regardless of the action of the tone arm 28, and thus prevents automatic closing of the clutch 58.

A link 289 connects the lever 287 to one arm of a bell-crank lever 290 on the frame 25. The other arm of the lever 290 is normally held against a stop 291 by a tension spring 292 to hold the spring 288 out of the path of the lug 286. A finger 293 is secured to the shaft 283, and is movable into engagement with the lever 290 to effect movement of the spring stop 288 into operative position upon adjustment of the actuator 284 into "neutral" position indicated on the panel 56. In this position, the bar 282 is out of engagement with the levers 187 and 258.

Résumé of operation

Any desired number of records up to a full stack are positioned on the base plate 103 of the magazine. The switch 42 now is actuated to close the motor circuit, and then the key 77 is pressed to effect closing of the clutch 58, thus instituting operation of the cam member 57.

Assuming a record to be on the turntable 22, the pickup 30 is elevated and the tone arm 28 is swung clear of the record. The latch 252 is released into engagement with the hook 254, and the carrier 197 is raised to lift the record from the turntable. The latch 252 causes the carrier 197 to tilt into alignment with the entrance to the discharge receptacle 251 whereupon the record is discharged. Thereupon the latch 252 is withdrawn from the hook 254, thus causing the carrier 197 to tilt into alignment with the base plate 103 of the magazine. Meanwhile, the clutch 172 has been closed for one revolution, and hence the arm 110 is actuated to transfer the upper record of the stack onto the carrier 197. The carrier 197 now is lowered to position the record on the turntable 22.

If the record is a twelve inch record it will depress the stem 243. The cam member 57 now is effective to return the tone arm 28 to initial playing position, the arm being released through the action of the abutment 235 or the abutment 239 depending on the size of the record. Finally, upon completion of one revolution of the cam member 57, the clutch 58 is opened. When the tone arm 28 comes to rest at the completion of the playing of the record, the clutch 58 is closed automatically. The clutch 58 may also be closed at will any time during the playing of the record by actuating the button 77. Thereupon the foregoing operation is repeated.

Upon removal of the last record from the magazine, the switch 45 is actuated automatically to stop the operation of the phonograph. To re-institute the operation after positioning a new stack of records on the magazine, the hand switch 42 is actuated in a direction reverse to that in the first instance. A given record may be played repeatedly by moving the actuator 284 into "repeat" position. The phonograph may be rendered non-automatic by moving the actuator 284 into "neutral" position.

I claim as my invention:—

1. In a phonograph, in combination, a turntable adapted to support records of different sizes, a tone arm movable over said turntable, trip means for moving said arm inwardly, a fixed abutment for actuating said trip means to release said arm at a predetermined point in its inward movement, a supplemental abutment movable into operative position to actuate said trip means to release said arm at an earlier predetermined point in its inward movement, and means adapted to be actuated by a record of a predetermined size as the record is positioned on said turntable for moving said supplemental abutment into operative position.

2. In a phonograph, in combination, a turntable adapted to support records of different sizes, a tone arm mounted for swinging movement over said turntable, means for swinging said tone arm outwardly and then inwardly, a fixed abutment coacting with said means to release said tone arm at a predetermined point in its inward movement, and a supplemental abutment movable into operative position to coact with said means to release said tone arm at an earlier predetermined point in its inward movement.

3. In a phonograph, in combination, a turntable adapted to support a record, a tone arm movable over said record, trip means for moving said tone arm inwardly, an abutment having an inoperative position and having an operative position in which it is adapted to actuate said trip means to release said tone arm at a predetermined point, means operable by engagement with the record to move said abutment into operative position, and means for discharging the record from said turntable, said last mentioned means being operable to return said abutment to inoperative position.

4. In a phonograph, in combination, a turntable adapted to support a record, a tone arm mounted for swinging movement over said turntable, means for swinging said arm inwardly into playing position, a pivotal lever, a stem secured to one end of said lever and adapted in one position of said lever to be depressed through engagement with the underside of the record when the latter is placed on said turntable, and an abutment secured to the other end of said lever movable upon depression of said stem into position for engagement with said means to release said tone arm at a predetermined point in its inward movement.

5. In a phonograph, in combination, a turntable adapted to support a record, a tone arm mounted for swinging movement over said turntable, means for swinging said arm inwardly into playing position, a pivotal lever, a stem secured to one end of said lever and adapted in one position of said lever to be depressed through engagement with the underside of the record when the latter is placed on said turntable, an abutment secured to the other end of said lever movable upon depression of said stem into position for engagement with said means to release said tone arm at a predetermined point in its inward movement, spring means for yieldably holding said abutment in operative or inoperative position, and means for discharging the record from said turtable, said last mentioned means being automatically operable to return said abutment to inoperative position.

6. In a phonograph, in combination, a turntable adapted to support records of two different sizes, a tone arm mounted for swinging movement over said turntable, a lever movable in one direction to swing said tone arm outwardly beyond the initial playing position for the larger record, a detent carried by said lever for swinging said tone arm inwardly upon movement of said lever in the other direction, a power driving member for periodically oscillating said lever, a fixed abutment adapted to actuate said detent to release said tone arm over the initial playing position for the smaller record, a supplemental abutment movable into position by the weight of the larger record when the latter is placed on said turntable to actuate said detent to release said tone arm over the initial playing position for the larger record, and means operable by said member to discharge the record from said turntable, said means being automatically operable to move said supplemental abutment out of operative position.

7. In a phonograph, in combination, a turntable adapted to support records of two different sizes, a tone arm mounted for swinging movement over said turntable, a lever movable in one direction to swing said tone arm outwardly beyond the initial playing position for the larger record, a detent carried by said lever for swinging said tone arm inwardly upon movement of said lever in the other direction, a power driving member for periodically oscillating said lever, a cam arm on said detent, a fixed abutment adapted to coact with said cam arm to release said tone arm over the initial playing position for the smaller record, and a supplemental abutment movable into position to coact with said cam arm to release said tone arm over the initial playing position for the larger record.

8. In a phonograph, in combination, a turntable, a tone arm mounted for movement over said turntable, a rotary driving member for moving said arm outwardly, a drive shaft, a clutch normally tending to close for connecting said shaft to said member, a normally stationary detent for holding said clutch open, an oscillatory member, friction means responsive to the inward movement of said tone arm in the course of playing a record tending to move said oscillatory member into inoperative position, an arm connected to said detent for independent oscillatory movement and mounted for reciprocation on said oscillatory member to retract said detent from said clutch, said arm being formed with a pawl and a cam finger in spaced opposed relation, and a continuously rotating member driven from said shaft and having spaced lugs, one lug acting periodically against said cam finger to oscillate said pawl against the action of said friction means into the path of the other lug.

9. In a phonograph, in combination, a turntable adapted to support a record, a tone arm movable inwardly over said turntable, a clutch normally tending to close, a normally stationary detent for holding said clutch open, a trip member mounted for joint reciprocatory movement with said detent and for free oscillatory movement, spring means acting on said member to hold said detent in operative position, friction means responsive to the inward movement of said tone arm for oscillating said member in one direction into fixed inoperative position, and a continuously rotating member supporting said turntable and having a movable abutment and being operable to periodically oscillate said trip member in the other direction into operative position for delayed engagement by said abutment, said friction means being effective upon continued inward movement of said tone arm to return said member to said inoperative position before said engagement can occur.

10. In a phonograph, in combination, a turntable, a tone arm mounted for movement over said turntable, a rotary driving member for moving said arm outwardly, a drive shaft, a clutch normally tending to close for connecting said shaft to said member, a normally stationary detent for holding said clutch open, an oscillatory member, friction means responsive to the inward movement of said tone arm in the course of playing a record tending to move said oscillatory member into inoperative position, an arm connected to said detent for independent oscillatory movement and mounted for reciprocation on said oscillatory member to retract said detent from said clutch, said arm being formed with a pawl and a cam finger in spaced opposed relation, a continuously rotating member driven from said shaft and having spaced lugs, one lug acting periodically against said cam finger to oscillate said pawl against the action of said friction means into the path of the other lug, and means available at will tending to move said oscillatory member into inoperative position regardless of the movement of said tone arm.

11. In a phonograph, in combination, a turntable, a record magazine, a transfer member for removing records one by one from said magazine for positioning on said turntable, a drive spindle, a rotary drive member, a clutch for periodically connecting said spindle to said drive member to drive the latter through one revolution, means for actuating said transfer member, a clutch for connecting said means to said spindle, and means controlled by said drive member for effecting the closing of said last mentioned clutch for one revolution.

12. In a phonograph, in combination, a turntable, a record magazine, a transfer member for removing records one by one from said magazine for positioning on said turntable, a drive spindle, a rotary drive member, a clutch for periodically connecting said spindle to said drive member to drive the latter through one revolution, means for actuating said transfer member, a clutch for connecting said means to said spindle, means controlled by said drive member for effecting the closing of said last mentioned clutch for one revolution, and means available at will for locking said last mentioned means in inoperative position.

13. In a phonograph, in combination, a magazine adapted to support a stack of records, and a transfer member normally over the stack and means for moving said member periodically through variable distances toward the stack into selective engagement with the uppermost record and then laterally to remove the records one by one from the stack.

14. In a phonograph, in combination, a magazine having a base wall for supporting a stack of records, a lever movable vertically into selective engagement with the uppermost record and then laterally to discharge the record, and drive means for periodically actuating said lever to discharge the records one by one, said drive means including a yieldable clutch connection permitting variable vertical movement of said lever.

15. In a phonograph, in combination, a magazine having a base wall adapted to support a stack of records, a lever normally positioned in inoperative position over said magazine and movable vertically and laterally, said lever having a selector pin adapted to engage the central aperture of the uppermost record, and a rotary cam drive periodically operable for successively lowering said lever to engage the uppermost record, swinging said lever to discharge the record and returning said lever to inoperative position.

16. In a phonograph, in combination, a record magazine for supporting a stack of records, a centering pin for holding said records in position, and means comprising a transfer member for depressing said pin to a position where the bottom of said transfer member and the top of said pin are in line with the bottom of the uppermost record, to release the uppermost record and for engaging the central aperture of said record and moving said record from the stack in sliding engagement with and while supported by the remainder of said stack.

17. In a phonograph, in combination, a record magazine for supporting a stack of records, a centering pin for holding said records in position, a transfer member movable in one direction into the central aperture of the uppermost record to engage said record and to depress said pin to a position flush with the bottom of said uppermost record and in another direction to remove said record from the stack, and means for actuating said member successively in said directions.

18. In a phonograph, in combination, a record magazine having a base wall for supporting a stack of records, a centering pin normally extending through said wall for engaging the central apertures of the records, means for locking said pin in normal position, friction means for resisting movement of said pin, means for engaging the central aperture of the uppermost record and removing the record from the stack, and power means for releasing said first mentioned means and actuating said last mentioned means in timed relation.

19. In a phonograph, in combination, a record magazine having a base wall adapted to support a stack of records, a centering pin extending upwardly through said base wall for engaging the central apertures of the records, friction means for holding said pin yieldingly in position, a transfer member having a selector pin movable into the central aperture of the uppermost record and into engagement with said centering pin to depress the latter to a position flush with the bottom of said uppermost record and movable laterally to move the uppermost record, and means for returning said centering pin into its uppermost position.

20. In a phonograph, in combination, a record magazine for supporting a stack of records, a centering pin for holding the records in position, a transfer member, means for actuating said member periodically to depress said pin just below the uppermost record at any time and to remove the said record, means operable in timed relation to said first mentioned means for returning said pin into uppermost position and for locking said pin in said position during the idle periods of said transfer member.

21. In a phonograph, in combination, a record magazine having a base wall adapted to support a stack of records, a pivotal lever extending along the underside of said wall, a centering pin carried by said lever and normally extending through said wall for holding said records in position, a rotary cam normally locking said lever with said pin in uppermost position and periodically operable to release said lever, and means operable in timed relation to said cam for depressing said pin and removing the uppermost record from the stack.

22. In a phonograph, in combination, a magazine having a base wall for supporting a stack of records, a transfer member pivotally mounted for movement toward and from said wall, a lever coaxial with said member, a rotary cam member for oscillating said lever, a notch formed in said lever, and a spring actuated hook on said member engaging in said notch, one side of said notch being beveled to permit movement of said lever relatively to said member in one direction upon the application of a predetermined force.

23. In a phonograph, in combination, a magazine having a base wall for supporting a stack of records, a transfer member pivotal vertically toward and from said base wall, a coaxial pivotal member, cam means for oscillating said pivotal member through a predetermined range, and clutch elements normally spring pressed into engagement respectively on said members, said elements being separable to permit independent movement of said pivotal member in one direction upon the application of abnormal force.

24. In a phonograph, in combination, a magazine having a base wall for supporting a record, a support pivotal on an axis parallel to said wall, a transfer arm pivotal on said support on an axis perpendicular to said wall and pivotal with said support toward and from said wall, spring means tending to hold said arm in a fixed position, and cam means operable to oscillate said support to move said arm downwardly to engage the record and subsequently upwardly, and to swing said arm in its lowered position against the action of said spring means.

25. In a phonograph, in combination, a turntable adapted to support a record, a magazine adapted to support a stack of records, means for automatically transferring the records one by one onto the turntable, drive means for said turntable and said first mentioned means, a circuit including a switch for said drive means, and means automatically operable by said first mentioned means to actuate said switch to break said circuit upon removal of the last record from said magazine.

26. In a phonograph, in combination, a turntable adapted to support a record, a vertically movable support, a tilting carrier mounted on said support and normally tending upon being elevated to tilt in one direction under its own weight into position to receive a record, detent means for engaging said carrier to tilt said carrier against its weight in the other direction, means for elevating and lowering said support, and means operable in timed relation to said last mentioned means for effecting engagement of said detent means with said carrier during the initial upward movement, and then breaking said engagement.

27. In a phonograph, in combination, a turntable adapted to support a record, a vertically movable support, a tilting carrier pivotally mounted on said support, means for holding said carrier normally in a horizontal position about said turntable, a spring pressed detent movable into engagement with one end of said carrier to define a fulcrum, means for elevating said support to raise said carrier above said turntable and thereby tilt said carrier about said fulcrum so as to discharge the record from said turntable.

28. In a phonograph, in combination, a turntable adapted to support a record, a pair of vertically movable arms disposed at opposite sides of said turntable, a flanged tilting carrier having a base opening adapted to receive said turntable and pivotally mounted on said arms, said carrier tending to tilt in one direction under its own weight, a spring actuated detent movable into engagement with said carrier to cause said carrier to tilt in the other direction, means normally holding said detent in inoperative position, and means for elevating said arms to raise said carrier above said turntable, and in the course of said movement first to release said detent means for engagement with said carrier, and then to disengage said detent from said carrier.

MARTIN NYSTROM.